United States Patent [19]
Masel et al.

[11] Patent Number: 5,970,851
[45] Date of Patent: Oct. 26, 1999

[54] GRILLING APPLIANCE AND FOOD HOLDER THEREFOR

[75] Inventors: Ruben Masel, Ramat Hasharon; George Valdshtein, Givat Savvon, both of Israel

[73] Assignee: Dime Group Corp., New York, N.Y.

[21] Appl. No.: 08/613,231

[22] Filed: Mar. 8, 1996

Related U.S. Application Data

[63] Continuation-in-part of application No. PCT/US94/09968, Sep. 6, 1994.

[30] Foreign Application Priority Data

Sep. 9, 1993 [IL] Israel ......................................... 106957

[51] Int. Cl.$^6$ ................................................... A47J 37/08
[52] U.S. Cl. .............................. 99/334; 99/385; 99/389; 99/391; 99/400; 219/386; 219/521
[58] Field of Search .............................. 99/400, 446, 349, 99/401, 385, 402, 389–393, 331, 329 R, 326–335; 219/521, 537, 386, 413, 528, 529, 545

[56] References Cited

U.S. PATENT DOCUMENTS

| | | |
|---|---|---|
| 1,896,537 | 2/1933 | Bonaccorsi . |
| 1,912,353 | 5/1933 | Howe ........................................ 99/390 |
| 1,929,166 | 10/1933 | Freemon ..................................... 53/5 |
| 2,632,379 | 3/1953 | Kudo ........................................ 99/375 |
| 3,593,648 | 7/1971 | Walters ..................................... 99/332 |
| 3,746,837 | 7/1973 | Frey et al. ................................ 219/387 |
| 3,824,916 | 7/1974 | Green et al. .............................. 99/334 |
| 3,938,431 | 2/1976 | Potvin ...................................... 99/425 |
| 4,173,180 | 11/1979 | Reiland .................................... 99/391 |
| 4,261,257 | 4/1981 | Henderson et al. ....................... 99/386 |
| 4,762,058 | 8/1988 | Masel et al. .............................. 99/425 |
| 5,095,813 | 3/1992 | Escamilla et al. ........................ 99/349 |
| 5,178,059 | 1/1993 | Eschlboeck et al. ..................... 99/349 |
| 5,181,455 | 1/1993 | Masel et al. .............................. 99/391 |
| 5,487,328 | 1/1996 | Fujii ......................................... 99/390 |

*Primary Examiner*—Timothy F. Simone

[57] ABSTRACT

A grilling appliance includes a housing having a vertical food compartment for receiving a food article in a vertical position, a heated first grill plate mounted in a vertical position in one side of the food compartment, a heated second grill plate mounted in a vertical position in the opposite side of the food compartment, and a drive for driving the second grill plate to an extended position towards the first grill plate, or to a retracted position away from the first grill plate. Also described are food holders particularly useful with such grilling appliance.

16 Claims, 8 Drawing Sheets

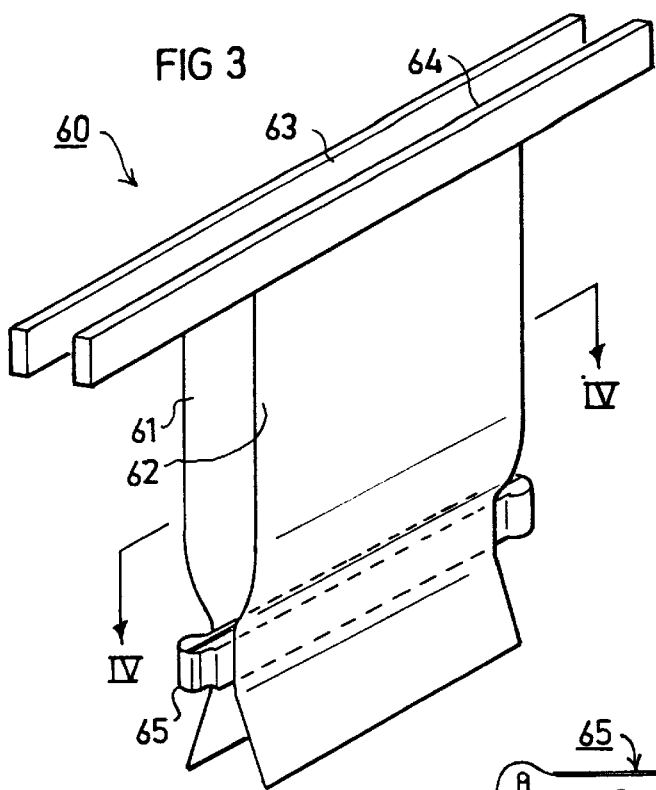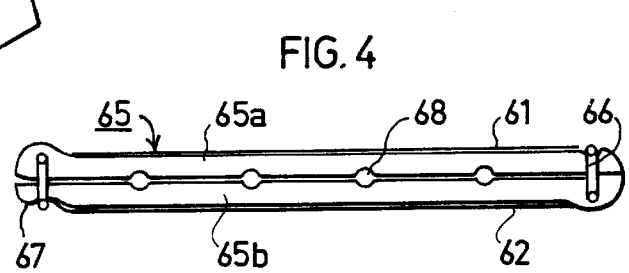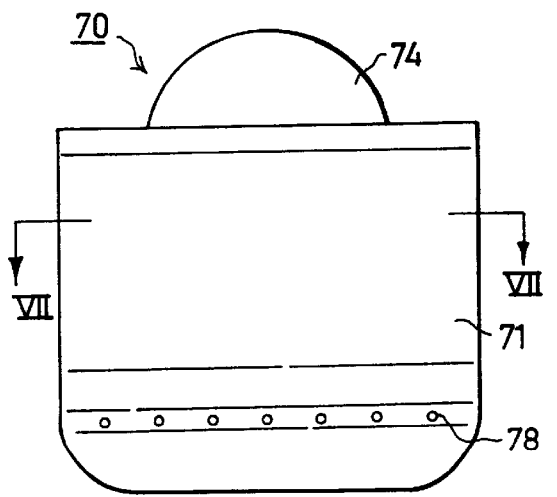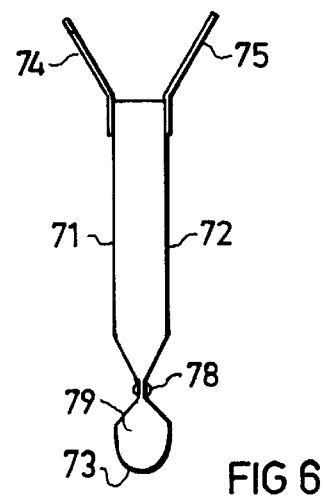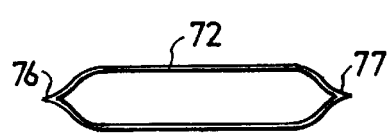

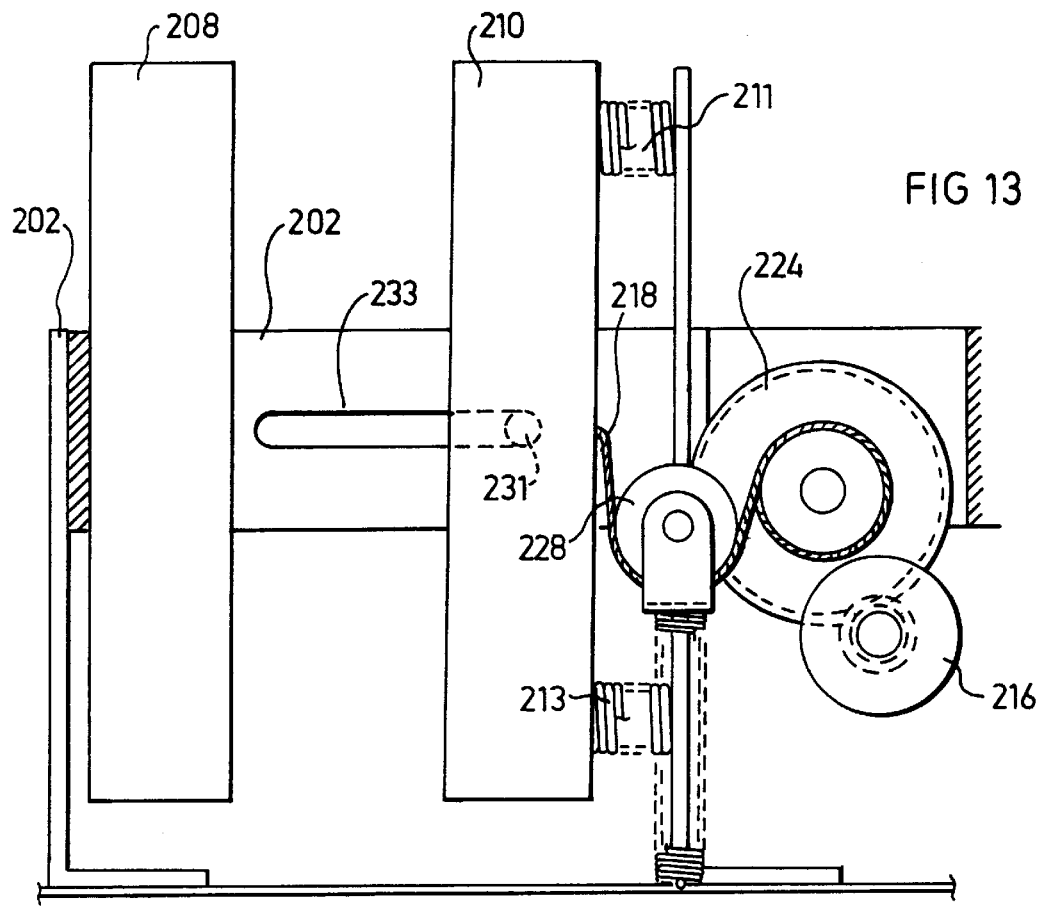
FIG 13
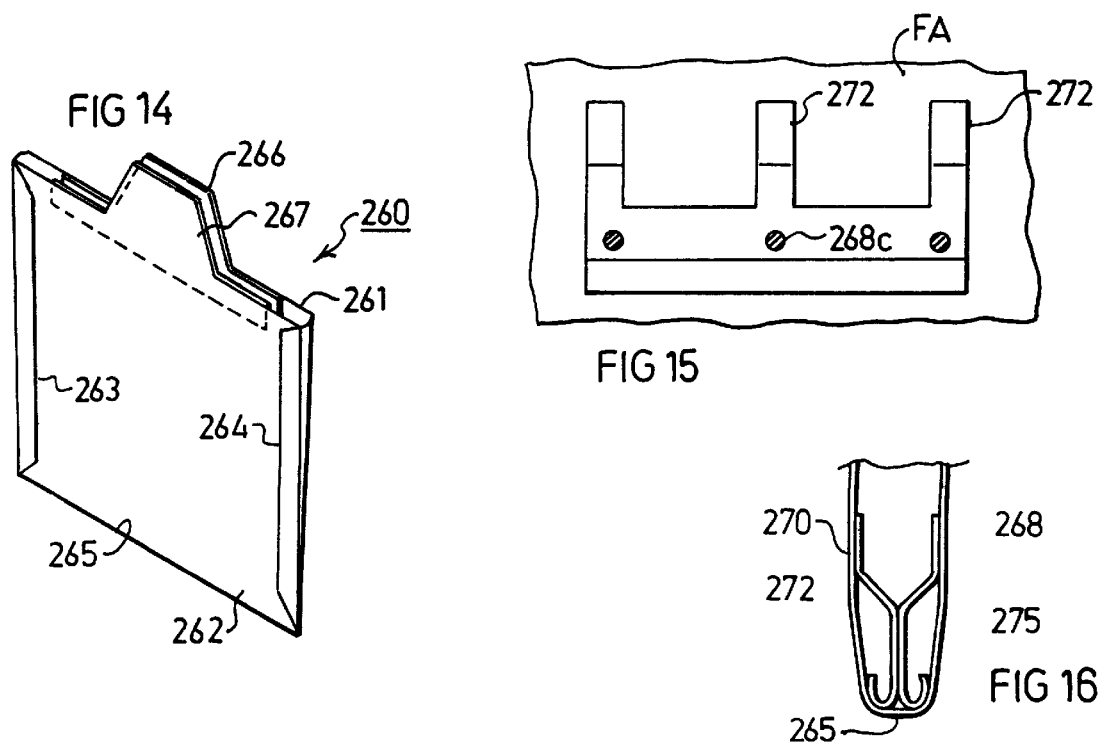
FIG 14
FIG 15
FIG 16

GRILLING APPLIANCE AND FOOD HOLDER THEREFOR

RELATED APPLICATIONS

The present application is a Continuation-In-Part of International Application PCT/US94/09968, claiming the priority date of Israel Application 106957 filed Sep. 9, 1993.

FIELD AND BACKGROUND OF THE INVENTION

The present invention relates to grilling appliances, and particularly to an electrical grilling appliance for use in grilling meat products, such as steaks, hamburgers, and the like, in an extremely short time. The invention also relates to food holders particularly useful in such grilling appliances.

A large number of electrical grilling appliances are known and described in the patent literature. The known grilling appliances generally include open grills, racks or meshes for holding the food article to be grilled. However, such grilling appliances usually require a considerable period of time to grill a steak or hamburger. Other appliances are known, such as described in our prior U.S. Pat. Nos. 4,762,058 and 5,181,455, which permit food articles to be grilled in a relatively short period of time.

An object of the present invention is to provide a novel simplified construction of electrical grilling appliance which permits food articles, such as steaks, hamburgers, and the like, to be grilled in a very short period of time.

OBJECT AND BRIEF SUMMARY OF THE INVENTION

According to the present invention, there is provided a grilling appliance, comprising: a housing including a vertical food compartment for receiving a food article in a vertical position; a heated first grill plate mounted in a vertical position in one side of the food compartment; a heated second grill plate mounted in a vertical position in the opposite side of the food compartment; and a drive for driving at least one of said grill plates while in its vertical position and substantially parallel to the other grill plate, to an extended position towards the other grill plate, or to a retracted position away from the other grill plate.

According to two described embodiments, the drive includes an electrical motor for driving the movable grill plate to both its extended and retracted positions. A further embodiment is described wherein an electrical motor drives the movable grill plate to its retracted position and a spring return drives it to its extended position.

As will be described more particularly below, a grilling appliance of relatively simple structure may be constructed in accordance with the foregoing features to permit food articles, particularly meat products, to be grilled in a very short period of time. Thus, when, e.g., the second grill plate is driven to its extended position, it presses the food article between it and the first grill plate thereby producing high heat transfer between the two grill plates and the food article, which substantially reduces the required grilling time. Moreover, when grilling an article of greater thickness, the appliance may be designed to apply a larger pressure by the two grilling plates, thereby increasing the heat transfer to it, and making the grilling time less dependent on the thickness of the food article.

Further features and advantages of the invention will be apparent from the description below.

BRIEF DESCRIPTION OF THE DRAWINGS

The invention is herein described, by way of example only, with reference to the accompanying drawings, wherein:

FIGS. 3 and 4 illustrate one type food holder for use in the grilling appliance of FIGS. 1 and 2, FIG. 4 being a sectional view along line IV—IV of FIG. 3;

FIGS. 5–7 illustrates another type food holder for use with the grilling appliance of FIGS. 1 and 2, FIG. 6 being a side elevational view of FIG. 5, and FIG. 7 being a sectional view along line VII—VII of FIG. 5;

FIG. 13 is a sectional view along line XIII—XIII of FIG. 12;

FIG. 14 is a three-dimensional view illustrating another form of food holder that may be used;

FIG. 15 is a side elevational view of the lower portion of the food holder of FIG. 14; and FIG. 16 is an end elevational view of the lower portion of the food holder of FIG. 14.

DESCRIPTION OF PREFERRED EMBODIMENTS

Figure 1:
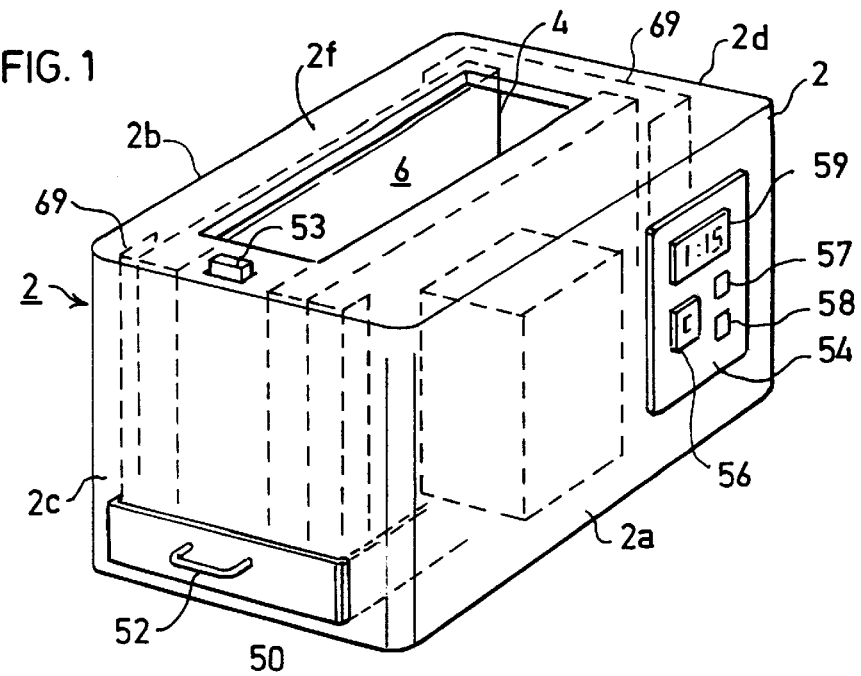
FIG. 1 is a three-dimensional view illustrating one form of grilling appliance constructed in accordance with the present invention.
Figure 2:
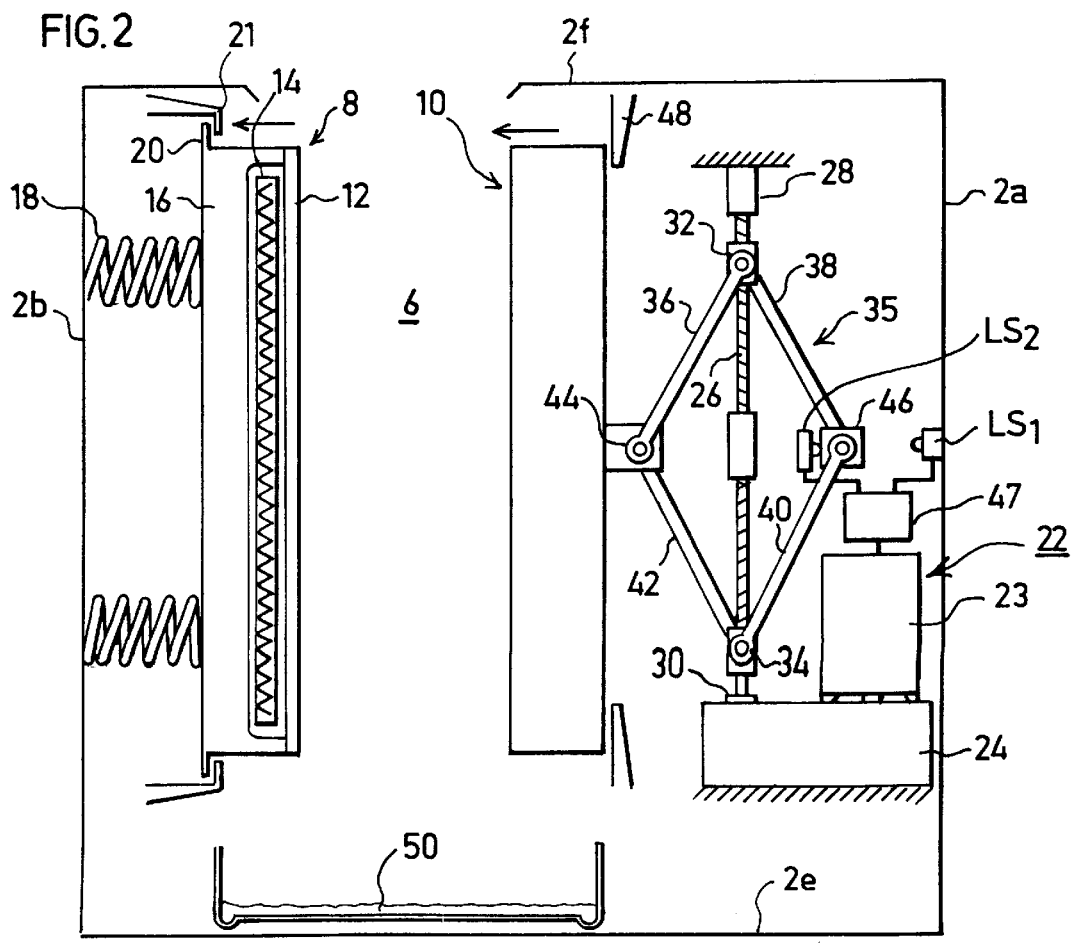
FIG. 2 diagrammatically illustrates the internal construction of the grilling appliance of FIG. 1.

The grilling appliance illustrated in FIGS. 1 and 2 of the drawings comprises a housing 2 of the general configuration of, but slightly larger than, a conventional electrical toaster. The housing includes a front wall 2a, a rear wall 2b, opposed end walls 2c, 2d, a bottom wall 2e and a top wall 2f. The top wall 2f is formed with an enlarged rectangular opening 4 for introducing the food article to be grilled into a food compartment 6 within the housing.

A first grill plate 8 is mounted in a vertical position on one side of the food compartment 6, and a second grill plate 10 is mounted in a vertical position on the opposite side of the food compartment. The two grill plates 8, 10 are similarly constructed with a metal face plate 12 facing the food compartment 6, an internal electrical heater 14, and thermal insulation 16.

Grill plate 8 is floatingly mounted to the housing end wall 2b by a plurality of horizontally-extending coil springs 18. This floating mounting permits universal angular movement of the grill plate about its X and Y axes, and further movement about its Z axis (i.e., towards and away from grill plate 10). Springs 18 are prestressed by an out-turned flange 20 carried at the outer periphery of grill plate 8, engageable with an inturned flange 21 carried by a wall of the housing 2.

Housing 2 includes a drive 22 for driving the second grill plate 10 from a retracted position (as shown in FIG. 2)

remote from the first grill plate 8, to an extended position towards grill plate 8. Drive 22 includes an electrical motor 23 coupled by a transmission 24 to rotate a lead screw 26 rotatably mounted between a pair of bearings 28, 30, fixed with respect to housing 2. A pair of nuts 32, 34 are threaded on opposite ends of the lead screw 26. The threads at the two ends are in opposite directions such that rotating the lead screw in one direction moves the nuts towards each other, and rotating the lead screw in the opposite direction moves the nuts away from each other. Nuts 32, 34 are coupled to grill plate 10 by a coupling mechanism which moves grill plate 10 towards its extended position during the rotation of the lead screw in one direction, and towards its retracted position during the rotation of the lead screw in the opposite direction.

Thus, the two nuts 32, 34, are at the opposite corners of a parallelogram 35 which includes four pivotal links 36, 38, 40, 42. The third corner of the parallelogram includes a ball-and-socket universal coupling 44 to grill plate 10 which permits the grill plate to move angularly in all directions. The fourth corner of the parallelogram carries a switch actuator 46 for actuating two limit switches $LS_1$, $LS_2$ fixed with respect to housing 2 on opposite sides of the actuator. The two limit switches are part of a motor control circuitry 47 (FIG. 2), controlling the electrical motor 23. Limit switch $LS_1$ is located to be actuated by actuator 46 to deenergize the motor 22 when grill plate 10 has been moved to its extended position towards grill plate 8, and limit switch $LS_2$ is located to be actuated by actuator 46 to deenergize the motor when the grill plate has been moved to its retracted position away from grill plate 8. Housing 2 may include a stop 48 engageable with the grill plate 10 in its retracted position.

A drip pan 50 is receivable within housing 2 to underlie the food compartment 6, and thereby to catch the drippings from the food article during the time it is being grilled. Drip pan 50 is insertable into the housing via an opening formed in the housing end wall 2c, and is provided with a handle 52 to facilitate introducing and removing it from the housing.

A microswitch 53, at one side of opening 4 in the top wall 2f of the housing, is depressible for energizing the electrical heaters 14 within the two grill plates 8, 10, and for energizing the electrical motor 23. The front wall 2a of the housing is provided with a control panel 54 which includes an on/off switch 56, an up-time timer button 57, a down-time timer button 58, and a timer display 59 permitting the grilling time to be pre-selected and displayed.

FIGS. 3 and 4 illustrate one form of food holder 60 which may be used with the grilling appliance of FIGS. 1 and 2 for holding the food articles within the grilling compartment 6 of the appliance. Food holder 60 includes a pair of flexible panels 61, 62 joined at their tops to a pair of handles 63, 64, and joined together at their bottoms by a clamping member 65. The sides of the two flexible panels 61, 62 are open so that the two panels may conveniently receive a food article (e.g., steak or hamburger) to be grilled. Clamp 65, which supports the food article between the two panels 61, 62, includes two jaws 65a, 65b pivotally mounted at one end by a clasp 66 or the like, and openable at the opposite end by a releasable clasp 67. The outer faces of the two jaws 65a, 65b are bonded to the inner faces of the two flexible panels 61, 62. The inner faces of the two jaws are formed with spaced recesses 68 defining drain openings to permit draining of liquids therethrough to the drip pan 50.

The flexible panels 61, 62 may be made of a heat-resistant, stick-resistant plastic, such as "Teflon" (Reg.T.M.), or of a flexible metal sheet material (e.g., aluminum) coated with such a heat-resistant, stick-resistant plastic. The dimensions of the flexible panel 61, 62 are larger than the dimensions of the two grill plates 8, 10, whereby they always completely cover them and keep them relatively clean. The overall thickness of the clamping member 65 is less than that of the food article to be held by the holder 60 so that the flexible panels 61, 62 better conform to the outer shape of the food article. A pair of removable splash guards 69 (FIG. 1) straddle the ends of the two grill plates 8, 10 on opposite sides of the food compartment 6.

The manner of using the grilling appliance illustrated in FIGS. 1 and 2, including the food holder of FIGS. 3 and 4, will be apparent from the above description. Thus, the movable grill plate 10 is initially in its retracted position, as shown in FIG. 2, with respect to the food compartment 6. The food article (e.g., a steak or hamburger) to be grilled is placed between the two flexible panels 61, 62 of the food holder 60, and the food holder is then introduced into the food compartment 6. The food article is suspended in the food compartment by the two handles 63, 64 engaging the outer surfaces of the housing top wall 2f on opposite sides of the opening 4. The microswitch 53 is actuated by one of the handles to energize the electrical heaters 14 within the grill plates 8, 10.

Switch 53 also energizes motor 23 to rotate lead screw 26. This moves grill plate 10 towards grill plate 8, and thereby firmly presses the food article between the two grill plates. Grill plate 10 is driven to this extended position until switch actuator 46 carried by the parallelogram 35 actuates limit switch $LS_1$, to deenergize the motor.

As grill plate 10 presses the food article against grill plate 8, grill plate 8 is permitted to move about all its three orthogonal axes by virtue of its floating mounting (coil springs 18) to the housing; and grill plate 10 is permitted to move about its two orthogonal axes by virtue of its ball-and-socket coupling 44 to the parallelogram 35. Grill plates 8, 10 are thus free to move to conform to the surface of the article being grilled within the food holder 60 as these grill plates apply pressure to the food article.

The firm pressure applied by the grill plates 8, 10 against the food article being grilled provides good heat-transfer from the grill plates to the food article, thereby speeding up the grilling process. The mounting springs 18 increase the pressure applied by the grill plates to the food articles with food articles of increased thickness, thereby making the grilling time less dependent on the thickness of the food articles.

When the grilling process has been completed, as preset by the timer, motor 23 is reenergized in the reverse direction, thereby retracting grill plate 10 until switch operator 46 actuates limit switch $LS_2$.

FIGS. 5–7 illustrate a one-time use food holder to be disposed after a single use. In this case, a single sheet is folded at a midportion to define a pair of flexible panels 71, 72, joined at their bottoms 73. The upper ends of the two sheets may be stiffened with cardboard strips to define handles 74, 75 which project outwardly of the appliance housing 2 when the food holder, including the food article held thereby, is inserted through opening 4 into the food compartment 6. In this case, the opposite sides of the flexible panels 71, 72, are joined together, as shown at 76 and 77 in FIG. 7, to produce a pocket for receiving the food article. This pocket is partially closed by a plurality of clips 78 extending through the two panels 71, 72, or by spots of adhesive or spot welds, adjacent the folded bottom 73, to define another compartment 79 for receiving the drippings from the food article.

Figure 8:
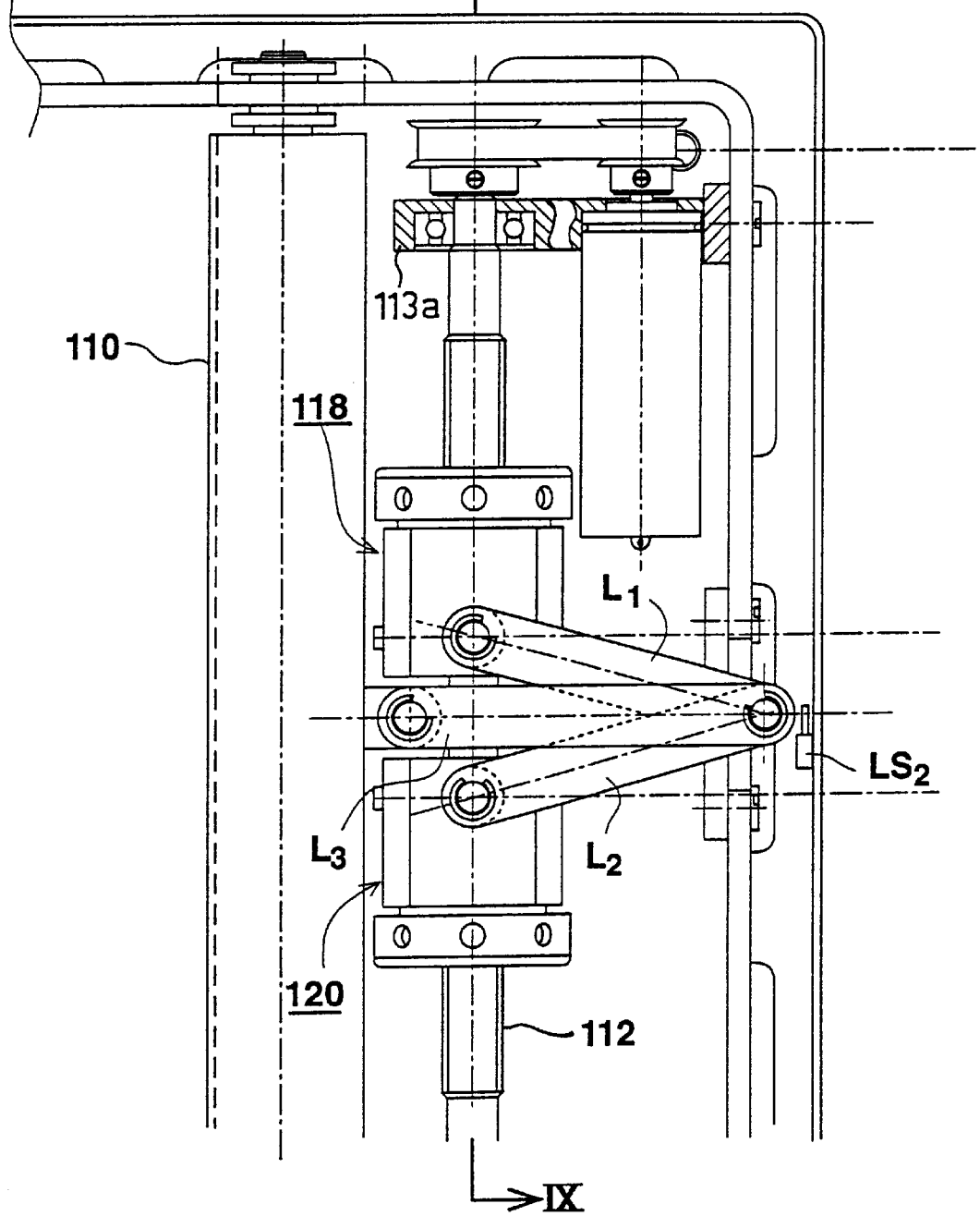
FIG. 8 illustrates a modification in the drive shown in FIG. 2 for driving one of the grill plates.
Figure 9:
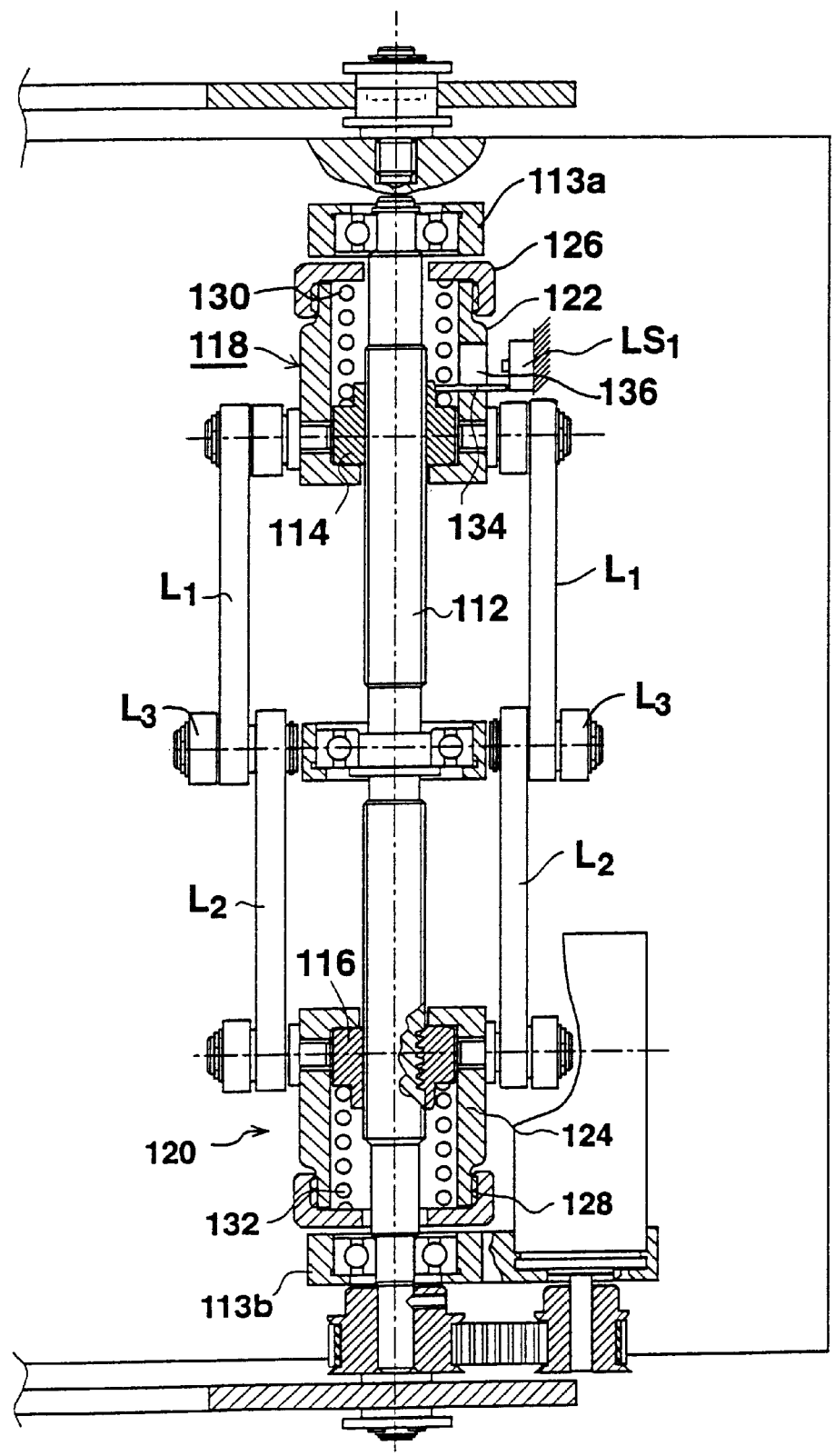
FIG. 9 is a sectional view along line IX—IX of FIG. 8 but illustrating the complete mounting of the lead screw.

FIGS. 8 and 9 illustrate a modification in the coupling mechanism of FIG. 2 coupling the grill plate 110 (corresponding to grill plate 10, FIG. 2) to the two nuts carried by the lead screw 112 rotatably mounted between bearings 113a, 113b, such that the grill plate is moved towards its extended position during the rotation of the lead screw in one direction, and towards its retracted position during the rotation of the lead screw in the opposite direction. The two nuts, shown at 114, 116 in FIG. 9, are each part of a nut assembly, 118, 120, respectively. Each assembly provides a force-yieldable coupling to grill plate 110, such as to yield when grill plate 110 forceably presses the food article against the other grill plate (8, FIG. 2).

Thus, each nut assembly 118, 120 includes a housing 122, 124 enclosing its respective nut and axially movable with respect thereto. Each housing 122, 124 is closed by an apertured end cap 126, 128, through which the lead screw 112 passes. A coil spring 130, 132 is interposed between the cap and nut of each assembly for urging the housing in the outward direction with respect to the nut.

A first pair of links $L_1$ are pivotally coupled at one of their ends to nut housing 122, and a second pair of links $L_2$ are pivotally coupled at one of their ends to nut housing 124. The opposite ends of the two pairs of links are pivotally coupled to one end of a third pair of links $L_3$, and the opposite ends of the latter links are pivotally coupled to grill plate 110.

A limit switch $LS_1$ is located to be actuated by an actuator 134 carried by nut 114. Actuator 134 projects through a slot 136 in housing 122 and actuates switch $LS_1$ upon the yielding of spring 130 a predetermined magnitude. Limit switch $LS_1$, as limit switch $LS_1$ in FIG. 2, deenergizes the electrical motor (23, FIG. 2) in the extended position of grill plate 110. A second limit switch $LS_2$ (FIG. 8) is actuated by the pivotal ends of the three pairs of links $L_1$, $L_2$, $L_3$ to deenergize the motor in the retracted position of the grill plate.

The coupling mechanism illustrated in FIGS. 8 and 9 operates as follows:

As in the grill-coupling mechanism illustrated in FIG. 2, the two nuts 114, 116 move towards each other during one direction of rotation of lead screw 112, and away from each during the opposite direction of rotation of the lead screw. In this case, however, when the drive motor (23, FIG. 2) is energized to drive lead screw 112 in the direction moving the two nuts 114, 116 further apart, the links $L_1$, $L_2$, $L_3$ are effective to move grill plate 112 to its extended position, i.e., towards the other grill plate (8, FIG. 2, rather than to its retracted position as in FIG. 2) with the food article between the two grill plates. As soon as grill plate 110 presses the food article against grill plate 8, the two springs 130, 132 begin to yield according to the force applied against the food article. Yielding of spring 130 causes switch actuator 134 carried by nut 114 to move towards limit switch $LS_1$, such that when this yielding has attained a predetermined magnitude, the limit switch $LS_1$ is actuated to deenergize the electrical motor in this extended position of grill plate 110. The motor is deenergized in its retracted position by limit switch $LS_2$ (FIG. 8).

This arrangement provides a number of advantages over the arrangement illustrated in FIG. 2. Thus, the extended position of grill plate 110 is not determined by a fixedly-located limit switch ($LS_1$ in FIG. 2), but rather is determined by the application of a predetermined force by the grill plate 110 to the food article while pressing it against the other grill plate (8, FIG. 2).

Moreover, this predetermined force varies with the thickness of the food article being grilled. Thus, the force applied by grill plate 110 to the food article in order to cause the two springs 130, 132 to yield, increases in an inverse relation to the distance between the two nut assemblies 118, 120 of the two springs 130, 132. Therefore, the magnitude of the force applied by grill plate 110 against the food article when the grill plate is in its extended position will be larger when relatively thick food articles are being grilled (as the two nut assemblies will then be closer together) than when thinner food articles are being grilled. This accelerates the grilling of relatively thick food articles, thereby making the grilling time less dependent on the thickness of the food articles being grilled. If the thickness of the food article decreases during the grilling process, the motor will be energized to maintain the pressure.

Figure 10:
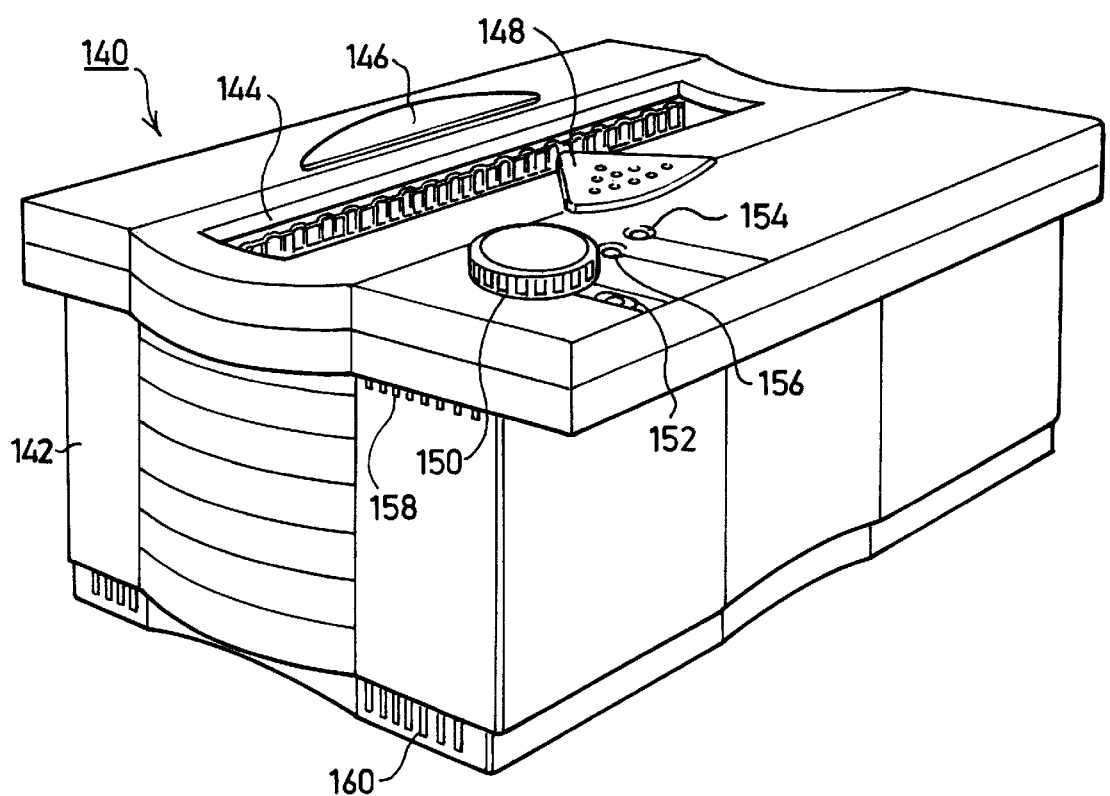
FIG. 10 is a three-dimensional view illustrating another external appearance that may be applied to the grilling appliance.

FIG. 10 illustrates one example of an external appearance that a grilling appliance constructed in accordance with the present invention may take, particularly one including the coupling mechanism illustrated in FIGS. 8 and 9. Thus, grilling appliance 140 includes a housing 142 formed with a large rectangular opening 144 in its top wall for introducing the food article to be grilled. Opening 144 is straddled by a pair of electrical switch operators 146, 148, both of which must be manually depressed in order to energize the electrical heaters and the electrical motor in the appliance. Thus, whether using the food holder illustrated in FIGS. 3 and 4, or the one-time use food holder illustrates in FIGS. 5–7, the two handles of the food holder must be pressed against the two switch operators 146, 148 in order to energize the appliance. This is a safety feature to lessen the possibility of an operator accidentally having a finger or hand within opening 144 at the time the appliance is energized.

The appliance illustrated in FIG. 10 further includes a presettable timer 150, a display 152, displaying the preset time, a pilot lamp 154 energized to indicate the appliance is on, and a second pilot lamp 156 energized to indicate that the electrical heaters are operating. Housing 142 is further provided with ventilating openings 158, 160.

Figure 11:
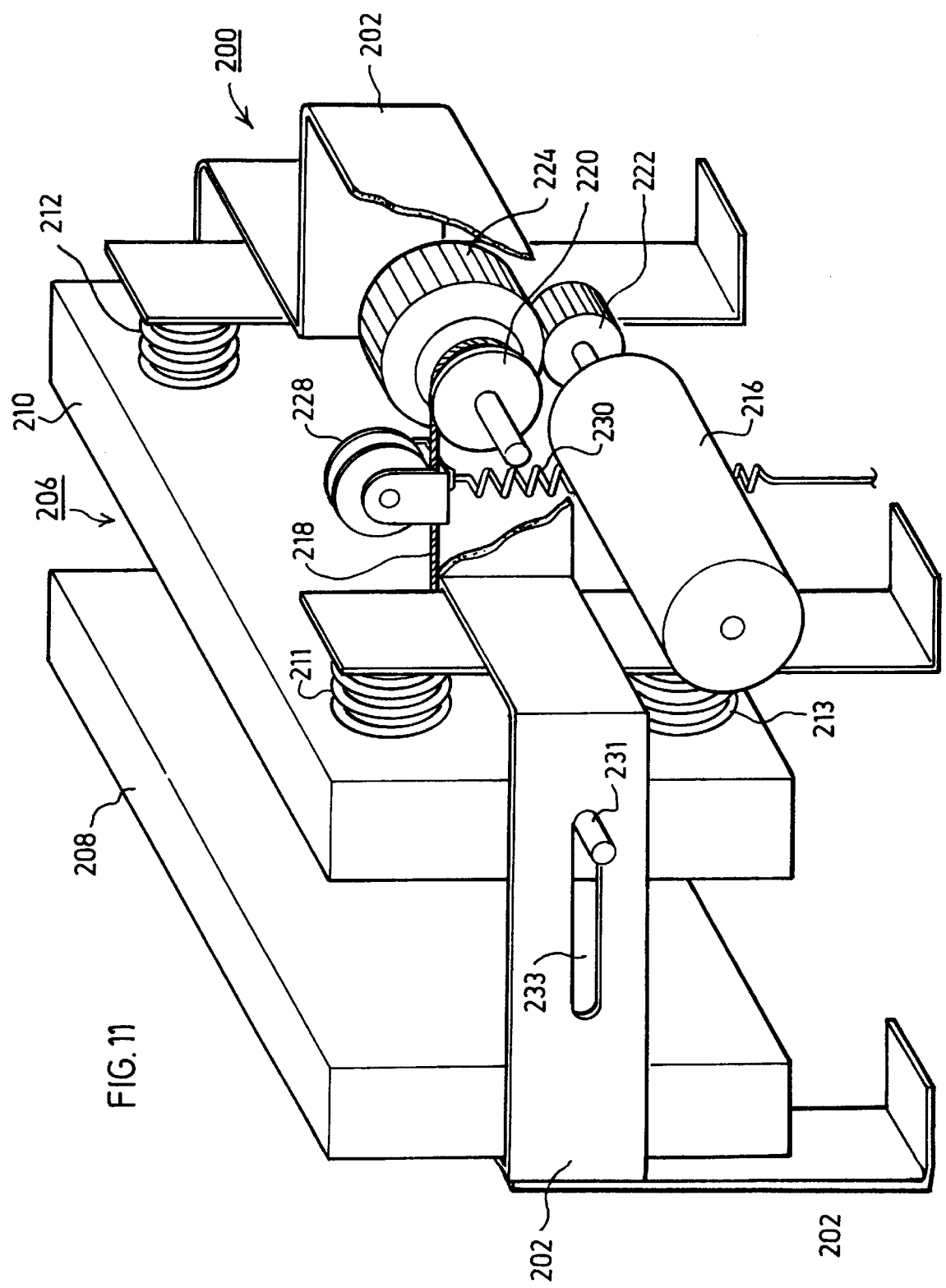
FIG. 11 is a three-dimensional view illustrating another drive system that may be used for driving one of the grill plates.
Figure 12:
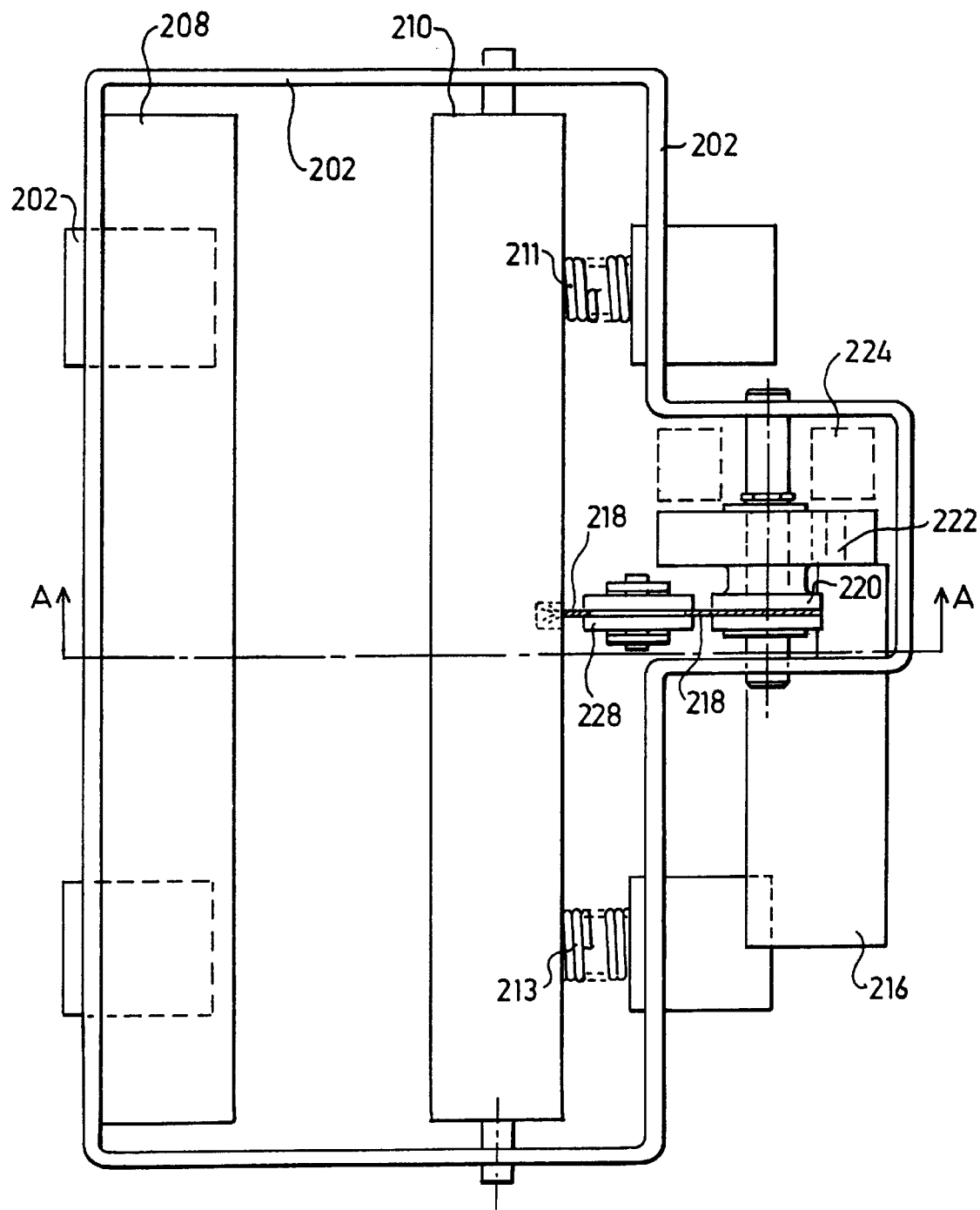
FIG. 12 is a top plan view of the drive system of FIG. 11.

FIGS. 11–13 illustrate another drive system, generally designated 200, within the housing, schematically indicated by its frame 202, for driving grill plate 210 with respect to the stationary grill plate 208 defining the vertical food compartment 206 receiving the food article to be grilled. Both grill plates 208 and 210 are constructed as described above with respect to FIG. 2, namely including a metal face plate (12, FIG. 2), an internal electrical heater (14), and thermal insulation (16). The stationary grill plate 208 may be floatingly mounted to the housing frame 202 by coil springs, corresponding to coil springs 18 in FIG. 2, or may be directly mounted to the housing frame.

The movable grill plate 210 is mounted to the housing frame 202 by four coil springs 211–214, fixed between the outer periphery of the grill plate, i.e., at its four corners, and the housing frame 202. The four coil springs 211–214 serve as a spring drive for driving or urging the movable grill plate 210 to its extended position, i.e., towards the stationary grill plate 208.

Grill plate 210 is driven to its retracted position, away from the stationary grill plate 208, by an electrical motor 216 via a cable 218 fixed at one end to the center of the grill plate, and at its opposite end to a drum 220 coupled by gearing 222 and 224 to motor 216. Drum 220 is formed with converging sides for retaining the cable on its outer surface. Gearing 222 and 224 are preferably designed so that drum 220 is rotated about 270° to drive grill plate 210 from its fully extended position slightly spaced from the stationary grill plate 208, to its fully retracted position. The drum 220 includes an actuator 226 (FIG. 12) engageable with two limit switches $LS_1$, $LS_2$ to terminate the operation of the electrical motor 216 at these two limit positions.

A roller 228 engages cable 218 between drum 220 and the driven grill plate 210, and is urged by spring 230 to take-up the slack in the cable. The movements of the driven grill plate 210 are guided by a pair of pins 231, 232 on its opposite sides, movable within slots 233, 234 formed in the housing frame 202.

In operation, grill plate 210 is driven to its fully retracted position, away from the stationary grill plate 218, by electric motor 216 via cable 218 wound on drum 220. Grill plate 210 is driven or urged in the return direction, i.e., to its extended position towards the stationary grill plate 208, by the return springs 211–214 which were previously loaded, during the retraction of grill plate 210 by electrical motor 216. During this movement of grill plate 210 towards the stationary grill plate 208, a food article received within compartment 206 will be compressed under the force of the previously-loaded springs 211–214 while the food article is heated. Since the force exerted by springs 211–214 is in direct relation to the deformation of the springs, a larger force will be applied to thicker food articles, such as steaks, than to thinner food articles, thereby accelerating the cooking of the thicker food articles. The springs 211–214 may be cylindrical (linear) springs, or conical (non-linear) springs.

FIGS. 14–16 illustrate another construction of multiple-use food holder, generally designated 260, including two flexible panels 261, 262, preferably of a heat-resistant, stick-resistant plastic sheet, such as "Teflon". The rear panel 261 may be thicker (e.g., 0.5 mm) than the front panel 262 (e.g., 0.1 mm), and may be bonded to the front panel by ultrasonic welding along its folded-over ends 263, 264, and also along its bottom 265. The two panels 261, 262 are bonded at their upper ends to handles 266, 267 of heat-resistant plastic or metal.

The food holder illustrated in FIGS. 14–16 further includes a spacer member, generally designated 268 (FIGS. 15, 16) for supporting the food article FA (e.g., hamburger, steak, etc.) within the food holder but spaced from its bottom 265 to permit the drippings to accumulate in the bottom. Thus, spacer member 268 includes a U-shaped socket 268a at its upper end for receiving the food article FA, and a curved leg 268b at its lower end engageable with, and spacing the food article FA above, the bottom of the food holder.

Spacer member 268 is preferably made of two stainless steel strips 270, 280, joined together at a straight juncture section 271, 281, by contact welding points 268c. Each strip is formed with a plurality of upstanding fingers 272, 282 at its upper end which together define the U-shaped socket 268a for receiving the food article. The lower end of each strip is formed with a semi-cylindrical curvature 273, 283 which together define the curved leg engageable with the bottom of the food holder for spacing the food article above the bottom. This space serves as a compartment 275 for receiving drippings from the food article as it is being grilled.

While the invention has been described with respect to several preferred embodiments, it will be appreciated that this is set forth merely for purposes of example, and that many variations may be made. For example, instead of having an electrical motor drive for driving one grill plate to both its extended and retracted positions, or an electrical motor for driving it to its retracted position and a spring for driving it to its extended position, as described above, the appliance could include a manual drive for driving the grill plate to its retracted position, and a spring drive or manual driving for driving it to its extended position. In addition, both grill plates could be driven, towards or away from each other, rather than only one. Many other variations, modifications and applications of the invention will be apparent.

What is claimed is:

1. A grilling appliance, comprising:
    a housing including a vertical food compartment for receiving a food article in a vertical position;
    a heated first grill plate mounted in a vertical position in one side of the food compartment;
    a heated second grill plate mounted in a vertical position in the opposite side of the food compartment;
    and a drive for driving at least one of said grill plates, while in its vertical position and substantially parallel to the other grill plate, to an extended position towards the other grill plate, and to a retracted position away from the other grill plate.

2. The appliance according to claim 1, wherein each of said grill plates includes an electrical heater enclosed within the respective grill plate.

3. The appliance according to claim 1, wherein said first grill plate is floatingly mounted by a spring assembly including a plurality of prestressed horizontally-extending coil springs mounting the first grill plate to a wall of the housing.

4. The appliance according to claim 1, wherein said drive includes an electrical motor for driving said at least one grill plate to both its extended position and to its retracted position.

5. The appliance according to claim 1, wherein said drive includes an electrical motor for driving said at least one grill plate to its retracted position, and a spring return for driving said at least one grill plate to its extended position.

6. The appliance according to claim 1, wherein said drive drives said second grill plate towards said first grill plate and comprises: an electrical motor including motor control circuitry therefor; a lead screw rotated by the motor and including a pair of nuts threaded thereon such that the nuts are moved towards or away from each other by the rotation of the lead screw according to the direction of rotation thereof; and a pivotable coupling mechanism coupling the two nuts to the second grill plate to move it towards its extended position during the rotation of the lead screw in one direction, and towards its retracted position during the rotation of the lead screw in the opposite direction.

7. The appliance according to claim 4, wherein said coupling mechanism includes a force-yieldable coupling which yields when the second grill plate forceably presses the food article against the first grill plate, said motor control circuitry including an electrical switch which deenergizes the electrical motor when said coupling yields a predetermined magnitude.

8. The appliance according to claim 1, wherein said housing includes an opening in a top wall thereof in alignment with said food compartment for introducing the food article into said food compartment, and said appliance further includes a food holder for holding a food article introduceable through said opening into the food compartment, said food holder including a pair of handles projecting externally of the housing to facilitate introducing and removing the food holder and the food article held thereby with respect to said food compartment.

9. The appliance according to claim 8, wherein said food holder comprises a pair of flexible panels joined at their tops to the pair of handles and joined together at their bottoms for holding the food article between the flexible panels; said pair of handles being engageable with the outer surface of the housing top wall to support the food holder and the food articles held thereby in suspension in said food compartment.

10. The appliance according to claim 9, wherein the pair of flexible panels are joined at their bottoms by a clamping member formed with a plurality of drain openings to permit draining of liquid therethrough; said clamping member comprising a pair of openable and closable jaws extending across the pair of flexible panels and joined to their inner faces.

11. The appliance according to claim 9, wherein said pair of flexible panels are constituted of a sheet defining a first pocket for receiving the food article, and a second pocket below the first pocket and communicating therewith via a plurality of openings for collecting drippings from the food article.

12. The appliance according to claim 9, wherein said food holder further includes a spacer member for supporting the food article within the food holder but spaced from the bottom of the food holder.

13. The appliance according to claim 12, wherein said spacer member includes a U-shaped socket at its upper end for receiving the food article, and a curved leg at its lower end engageable with, and spacing the food article above, the bottom of the food holder.

14. A grilling appliance, comprising:
- a housing incuding a vertical food compartment for receiving a food article in a vertical position;
- a heated first grill plate mounted in a vertical position in one side of the food compartment;
- a heated second grill plate mounted in a vertical position in the opposite side of the food compartment;
- an electrical motor for driving said second grill plate, while in its vertical position and substantially parallel to said first grill plate, in one direction to a retracted position away from said first grill plate;
- and a spring return for driving said second grill plate in the opposite direction to an extended position towards said first grill plate.

15. The appliance according to claim 14, wherein said spring return comprises a plurality of coil springs fixed between the housing and the periphery of said second grill plate.

16. The appliance according to claim 15, wherein said second grill plate inculdes guiding pins for guiding its movements to its extended and retracted positons, said guiding pins being carried by said second grill plate on opposite sides thereof and movable within slots in a pair of guide members fixed to said housing.

* * * * *